United States Patent
Nam et al.

(10) Patent No.: US 8,228,862 B2
(45) Date of Patent: Jul. 24, 2012

(54) METHOD AND SYSTEM FOR REFERENCE SIGNAL PATTERN DESIGN

(75) Inventors: Young-Han Nam, Richardson, TX (US); Jianzhong Zhang, Irving, TX (US); Shadi Abu-Surra, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 12/607,682

(22) Filed: Oct. 28, 2009

(65) Prior Publication Data

US 2010/0135242 A1 Jun. 3, 2010

Related U.S. Application Data

(60) Provisional application No. 61/200,720, filed on Dec. 3, 2008.

(51) Int. Cl.
*H04W 72/04* (2009.01)
*H04W 72/28* (2006.01)
*H04B 7/00* (2006.01)

(52) U.S. Cl. ........ 370/329; 370/330; 370/335; 370/463; 455/450; 455/452.2; 455/509; 375/260

(58) Field of Classification Search .......... 370/218–463; 455/436–522; 709/221–278; 375/260–330
See application file for complete search history.

(56) References Cited

U.S. PATENT DOCUMENTS

| 7,778,364 | B2 * | 8/2010 | Wang et al. | 375/343 |
|---|---|---|---|---|
| 2003/0198180 | A1 * | 10/2003 | Cambron | 370/216 |
| 2009/0238241 | A1 * | 9/2009 | Hooli et al. | 375/133 |
| 2010/0008282 | A1 * | 1/2010 | Bhattad et al. | 370/312 |
| 2010/0202399 | A1 * | 8/2010 | Catreux-Erceg et al. | 370/329 |
| 2010/0208629 | A1 * | 8/2010 | Ahn et al. | 370/280 |
| 2011/0134849 | A1 * | 6/2011 | Lee et al. | 370/328 |
| 2011/0228722 | A1 * | 9/2011 | Noh et al. | 370/315 |
| 2011/0235608 | A1 * | 9/2011 | Koo et al. | 370/329 |

* cited by examiner

*Primary Examiner* — Afsar M. Qureshi

(57) ABSTRACT

A base station comprising an allocator configured to allocate a plurality of dedicated reference (DR) signals to selected resource elements. In the even-numbered time slot in a first resource block, a first group of DR signals are: i) allocated to a first group of adjacent resource elements; and ii) allocated to a second group of adjacent resource elements. In the contiguous odd-numbered time slot in the first resource block, the first group of DR signals are allocated to a third group of adjacent resource elements. In the even-numbered time slot in a second resource block, the first group of adjacent DR signals are allocated to a fourth group of resource elements. In the contiguous odd-numbered time slot in the second resource block, the first group of DR signals are: i) allocated to a fifth group of adjacent resource elements; and ii) allocated to a sixth group of adjacent resource elements.

20 Claims, 17 Drawing Sheets

― 900

| Rank | Density (RE/port) | Total # of REs for RS |
|---|---|---|
| 1 | 8 | 8*1 = 8 |
| 2 | 8 | 8*2 = 16 |
| 3 | 8 | 8*3 = 24 |
| 4 | 8 | 8*4 = 32 |
| 5 | 4 | 4*5 = 20 |
| 6 | 4 | 4*6 = 24 |
| 7 | 4 | 4*7 = 28 |
| 8 | 4 | 4*8 = 32 |

METHOD AND SYSTEM FOR REFERENCE SIGNAL PATTERN DESIGN

CROSS-REFERENCE TO RELATED APPLICATION(S) AND CLAIM OF PRIORITY

The present application is related to U.S. Provisional Patent No. 61/200,720, filed Dec. 3, 2008, entitled "PILOT DESIGN FOR DOWNLINK COMMUNICATIONS IN A WIRELESS SYSTEM". Provisional Patent No. 61/200,720 is assigned to the assignee of the present application and is hereby incorporated by reference into the present application as if fully set forth herein. The present application hereby claims priority under 35 U.S.C. §119(e) to U.S. Provisional Patent No. 61/200,720.

TECHNICAL FIELD OF THE INVENTION

The present application relates generally to wireless communications and, more specifically, to a method and system for reference signal (RS) pattern design.

BACKGROUND OF THE INVENTION

In $3^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

For use in a wireless network comprising a plurality of base stations for communicating with subscriber stations using orthogonal frequency division multiplexing (OFDM), a first base station is provided. The first base station comprises a downlink transmit path comprising circuitry configured to transmit a plurality of dedicated reference (DR) signals in even-numbered time slots and odd-numbered time slots. Each of the even-numbered and odd-numbered time slots comprising S OFDM symbols. Each of the S OFDM symbols comprising N subcarriers, and each subcarrier of each OFDM symbol comprises a resource element. Resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot. The first base station further comprises a reference signal allocator configured to allocate the plurality of DR signals to selected resource elements. In the even-numbered time slot in the first resource block, a first group of DR signals area i) allocated to a first group of adjacent resource elements; and ii) allocated to a second group of adjacent resource elements. In the contiguous odd-numbered time slot in the first resource block, the first group of DR signals are allocated to a third group of adjacent resource elements. In the even-numbered time slot in the second resource block, the first group of DR signals are allocated to a fourth group of adjacent resource elements. In the contiguous odd-numbered time slot in the second resource block, the first group of DR signals are: i) allocated to a fifth group of adjacent resource elements; and ii) allocated to a sixth group of adjacent resource elements.

A wireless network comprising a plurality of base stations capable of wireless communication with a plurality of subscriber stations within a coverage area of the network using orthogonal frequency division multiplexing (OFDM) is provided. Each of the plurality of base stations comprises a downlink transmit path comprising circuitry configured to transmit a plurality of dedicated reference (DR) signals in even-numbered time slots and odd-numbered time slots. Each of the even-numbered and odd-numbered time slots comprising S OFDM symbols. Each of the S OFDM symbols comprising N subcarriers, and each subcarrier of each OFDM symbol comprises a resource element. Resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot. The first base station further comprises a reference signal allocator configured to allocate the plurality of DR signals to selected resource elements. In the even-numbered time slot in the first resource block, a first group of DR signals are: allocated to a first group of adjacent resource elements; and i) allocated to a second group of adjacent resource elements. In the contiguous odd-numbered time slot in the first resource block, the first group of DR signals are allocated to a third group of adjacent resource elements. In the even-numbered time slot in the second resource block, the first group of DR signals are allocated to a fourth group of adjacent resource elements. In the contiguous odd-numbered time slot in the second resource block, the first group of DR signals are: i) allocated to a fifth group of adjacent resource elements; and ii) allocated to a sixth group of adjacent resource elements.

A method of operating a base station for communicating with subscriber stations using orthogonal frequency division multiplexing (OFDM) is provided. The method comprising transmitting, by way of a downlink transmit path circuitry, a plurality of dedicated reference (DR) signals in even-numbered time slots and odd-numbered time slots. Each of the even-numbered and odd-numbered time slots comprising S OFDM symbols. Each of the S OFDM symbols comprising N subcarriers, and each subcarrier of each OFDM symbol comprises a resource element. Resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot. The method further comprising allocating, by way of a reference signal allocator, the plurality of DR signals to selected resource elements. In the even-numbered time slot in the first resource block, a first group of DR signals are: i) allocated to a first group of adjacent resource elements; and ii) allocated to a second group of adjacent resource elements. In the contiguous odd-numbered time slot in the first resource block, the first group of DR signals are allocated to a third group of adjacent resource elements. In the even-numbered time slot in the second resource block, the first group of DR signals are allocated to a fourth group of adjacent resource elements. In the contiguous odd-numbered time slot in the second resource block, the first group of DR signals area i) allocated to a fifth group of adjacent resource elements; and ii) allocated to a sixth group of adjacent resource elements.

For use in a wireless network comprising a subscriber station communicating with a base station using orthogonal frequency division multiplexing (OFDM), a subscriber station is provided. The subscriber station comprises a downlink receive path comprising circuitry configured to receive a plurality of dedicated reference (DR) signals in even-numbered time slots and odd-numbered time slots. Each of the even-numbered and odd-numbered time slots comprising S OFDM symbols. Each of the S OFDM symbols comprising N subcarriers, and each subcarrier of each OFDM symbol comprises a resource element. The source elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot. In the even-numbered time slot in the first resource block, a first group of DR signals are: i) allocated to a first group of adjacent resource elements; and ii) allocated to a second group of adjacent resource elements. In the contiguous odd-numbered time slot in the first resource block, the first group of DR signals are allocated to a third group of adjacent resource elements. In the even-numbered time slot in the second resource block, the first group of DR signals are allocated to a fourth group of adjacent resource elements. In the contiguous odd-numbered time slot in the second resource block, the first group of DR signals are: i) allocated to a fifth group of adjacent resource elements; and ii) allocated to a sixth group of adjacent resource elements.

For use in a wireless network comprising a plurality of base stations for communicating with subscriber stations using orthogonal frequency division multiplexing (OFDM), a first base station is provided. The first base station comprises a downlink transmit path comprising circuitry configured to transmit a plurality of dedicated reference (DR) signals in a resource block. The resource block comprising S OFDM symbols. Each of the S OFDM symbols comprising N subcarriers, and each subcarrier of each OFDM symbol comprises a resource element. The first base station further comprises a reference signal allocator configured to allocate a number of resource elements of the resource block for transmitting DR signals corresponding to a first data stream, and to adjust the number of resource elements used for transmitting DR signals corresponding to the first data stream based at least partly upon a transmission rank of the resource block. The transmission rank is based at least partly upon a number of different data streams transmitted in the resource block.

A wireless network comprising a plurality of base stations capable of wireless communication with a plurality of subscriber stations within a coverage area of the network using orthogonal frequency division multiplexing (OFDM) is provided. Each of the plurality of base stations comprises a downlink transmit path comprising circuitry configured to transmit a plurality of dedicated reference (DR) signals in a resource block. The resource block comprising S OFDM symbols. Each of the S OFDM symbols comprising N subcarriers, and each subcarrier of each OFDM symbol comprises a resource element. Each of the plurality of base stations further comprises a reference signal allocator configured to allocate a number of resource elements of the resource block for transmitting DR signals corresponding to a first data stream, and to adjust the number of resource elements used for transmitting DR signals corresponding to the first data stream based at least partly upon a transmission rank of the resource block. The transmission rank is based at least partly upon a number of different data streams transmitted in the resource block.

A method of operating a base station for communicating with subscriber stations using orthogonal frequency division multiplexing (OFDM) is provided. The method comprising transmitting, by way of a downlink transmit path circuitry, a plurality of dedicated reference (DR) signals in a resource block. The resource block comprising S OFDM symbols. Each of the S OFDM symbols comprising N subcarriers, and each subcarrier of each OFDM symbol comprises a resource element. The method also comprises allocating, by way of a reference signal allocator, a number of resource elements of the resource block for transmitting DR signals corresponding to a first data stream. The number of resource elements used for transmitting DR signals corresponding to the first data stream is based at least partly upon a transmission rank of the resource block. The transmission rank is based at least partly upon a number of different data streams transmitted in the resource block.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
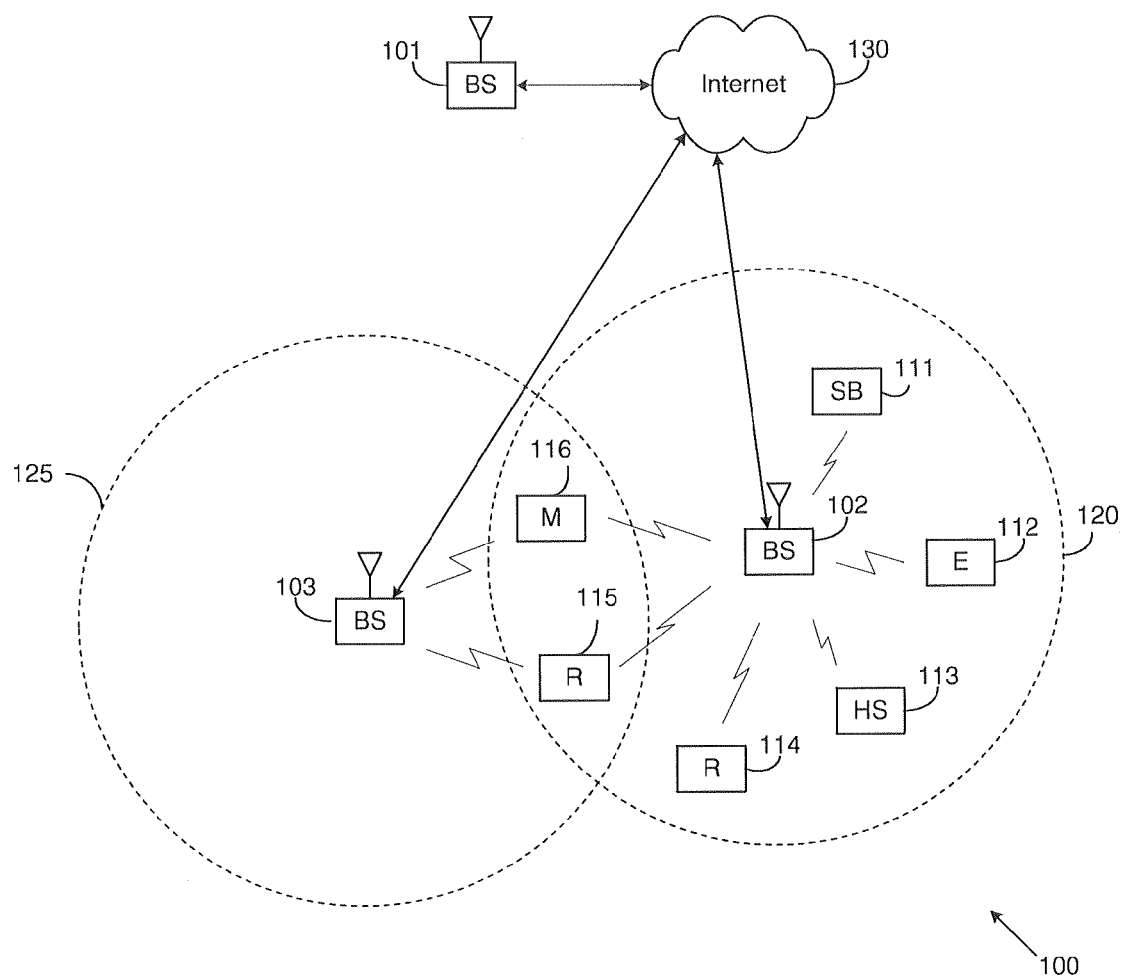
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
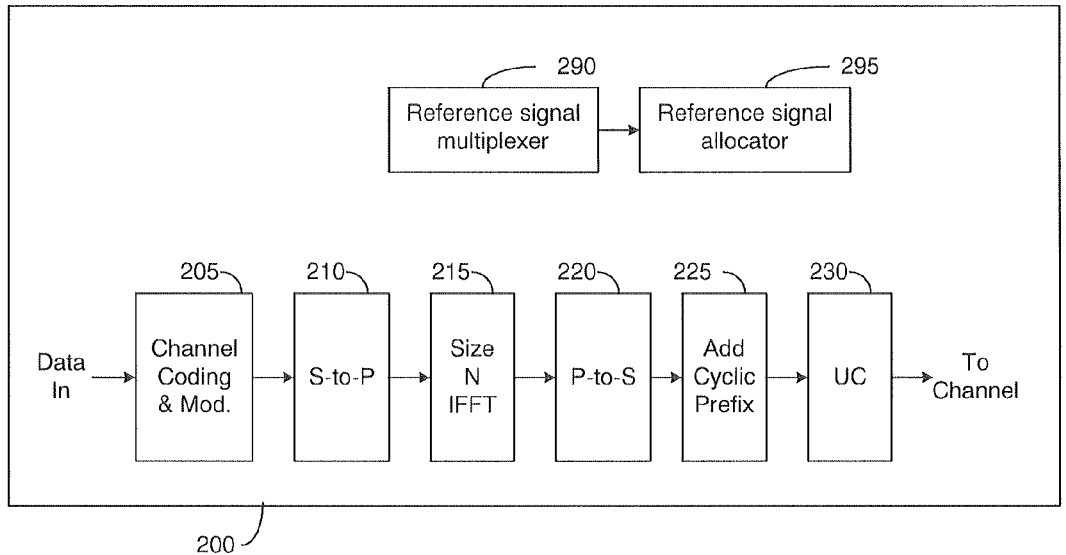
FIG. 2 is a high-level diagram of an OFDMA transmitter according to one embodiment of the present disclosure.
Figure 3:
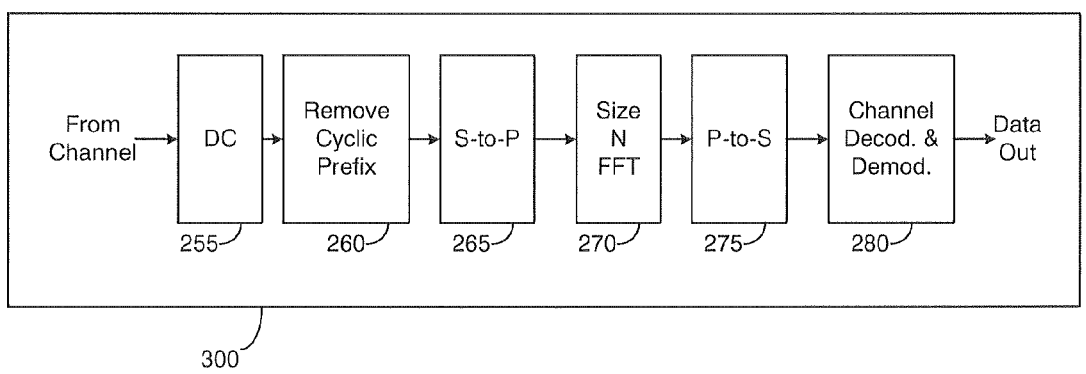
FIG. 3 is a high-level diagram of an OFDMA receiver according to one embodiment of the present disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for reference signal (RS) pattern design.

The transmitted signal in each slot of a resource block is described by a resource grid of $N_{RB}^{DL} N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where k=0, . . . , $N_{RB}^{DL} N_{sc}^{RB}-1$ and l=0, . . . , $N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

An important design consideration in LTE-Advanced (LTE-A) systems is backward compatibility to allow an LTE user equipment (UE) to operate in LTE-A system while still satisfying the LTE performance target. Accordingly, the reference signals (RSs) in an LTE-A system should be designed to allow an LTE-A UE to fully exploit the new functionalities of LTE-A systems, such as relaying, coordinated multipoint transmissions and 8 transmit-antenna (8-Tx) multi-input-multi-output (MIMO) communications, while minimizing the impact on the throughput performance of LTE UEs.

The present disclosure defines new sets of RSs for the 8-Tx transmissions in LTE-A. As in LTE, the new sets of RSs are classified as cell-specific RSs (or common RS, CRS) and UE-specific RSs (or dedicated RS, DRS). CRSs can be accessed by all the UEs within the cell covered by the eNodeB regardless of specific time/frequency resource allocated to the UEs. CRSs can be used for CQI/PMI/RI measurement and/or demodulation at a UE. Conversely, DRSs are transmitted by the eNodeB only within certain resource blocks such that only a subset of UEs in the cell are allocated to receive the packet. Accordingly, the packets are accessed only by the subset of UEs.

At an RS RE, only one antenna port is turned on, while the other antenna ports are turned off. The RS REs for an antenna port have a staggered pattern in the time and frequency grid. The staggered pattern is intended for improving the frequency resolution of the channel estimation. In addition, the RS REs in an OFDM symbol are spaced apart by having a few data REs between two consecutive RS REs, so that cell-specific frequency shifting can be used for interference management. When cell-specific frequency shifting is applied, the subcarrier indices at RS REs in a resource block in a subframe circularly shift by an integer number.

In the first few OFDM symbols in the first slot, if the OFDM symbols are used for supporting LTE UEs, the existing RS pattern defined in LTE is preserved, where at most two RS symbols of each of the antenna ports 0, 1, 2, 3 are mapped onto a subset of REs in the first one or two OFDM symbols in a resource block. Onto the REs in the other OFDM symbols, multiple sets of RSs are mapped for LTE-A UEs' CQI/PMI/RI measurement and/or demodulation. The four additional antenna ports used in LTE-A are called antenna ports a, b, c and d when the number of additional antenna ports is 4, for example.

Figure 4:
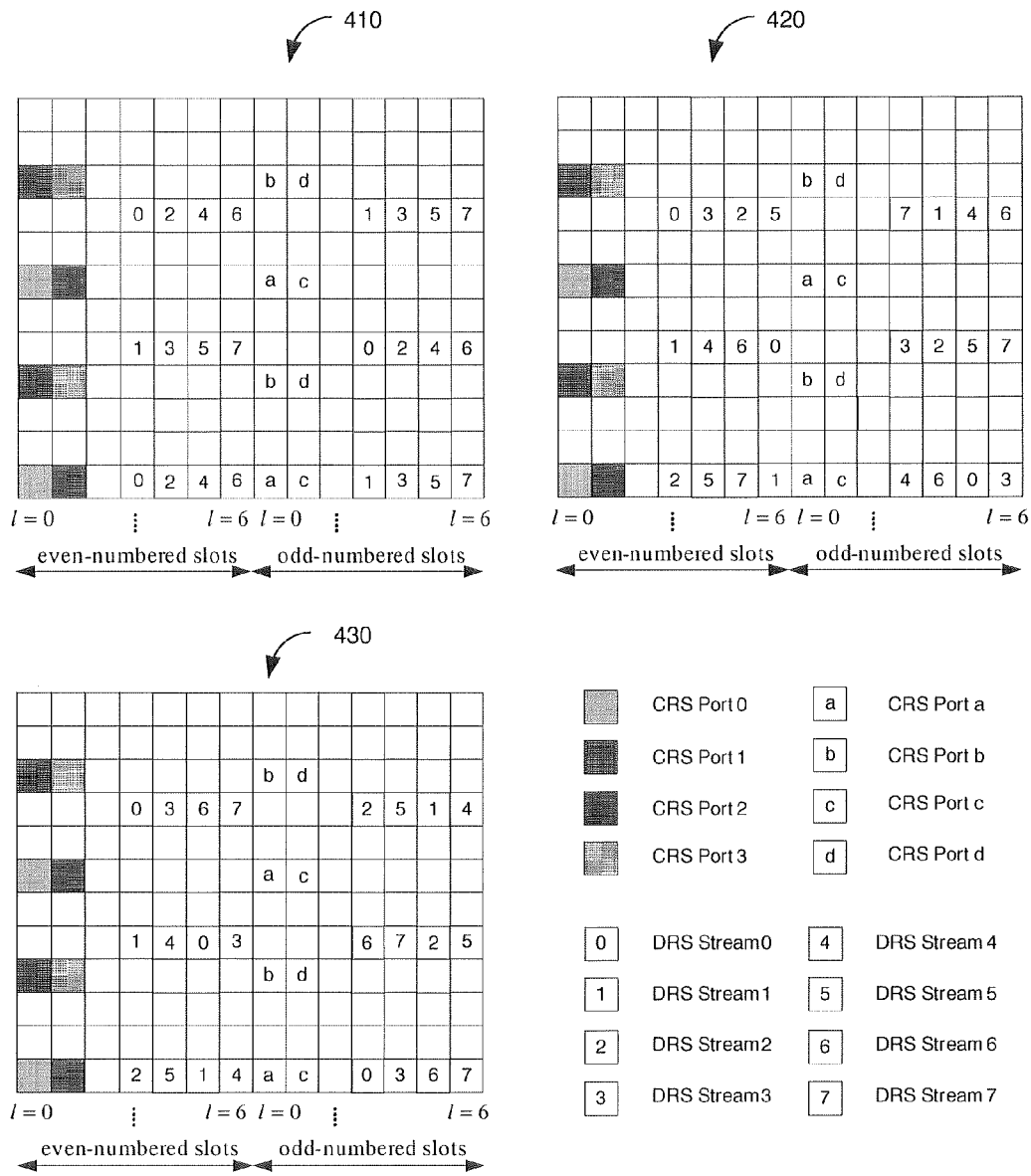
FIG. 4 illustrates DRS mappings according to an embodiment of the present disclosure.

FIG. 4 illustrates DRS mappings according to an embodiment of the present disclosure.

In the embodiment shown in FIG. 4, OFDM symbols 3, 4, 5, and 6 in both slots are chosen for the DRS mappings. Of course, one of ordinary skill in the art will recognize that any number of the OFDM symbols 2 to 6 in each slot may be chosen.

In FIG. 4, four sets of DRS streams are transmitted on the same set of RS REs, and the DRS streams are separated in different REs or are time/frequency-division-multiplexed (TFDM-ed), for example, by reference signal multiplexer 290.

As shown in FIG. 4, for each DRS stream, three RS symbols are mapped onto REs in two slots. One slot has two RS symbols for a particular DRS stream, and the other slot has one RS symbol for that DRS stream. For example, in the DRS mapping 410, DRS stream 0 has two RS symbols in OFDM symbol 3 in the even-numbered slots and one RS symbol in OFDM symbol 3 in the odd-numbered slots. In this particular embodiment in the first subcarrier where DRS symbols are mapped, the DRS port indices are in the order of (0,2,4,6,1, 3,5,7). The order of the DRS port indices in the second subcarrier where DRS symbols are mapped is (1,3,5,7,0,2,4,6). The order of the DRS port indices in the third subcarrier where DRS symbols are mapped is (0,2,4,6,1,3,5,7).

In the mapping 420, the DRS RE locations are the same as those shown in the mapping 410. The DRS port indices, however, differ. In the DRS mapping 420 in the first subcarrier where DRS symbols are mapped, the DRS port indices are in the order of (0,3,2,5,7,1,4,6). The order of the DRS port indices in the second subcarrier where DRS symbols are mapped is (1,4,6,0,3,2,5,7). The order of the DRS port indices in the third subcarrier where DRS symbols are mapped is (2,5,7,1,4,6,0,3).

In the DRS mapping 430, the DRS RE locations are the same as those shown in the DRS mappings 410 and 420. The DRS port indices, however, differ. In the DRS mapping 430 in the first subcarrier where DRS symbols are mapped, the DRS port indices are in the order of (0,3,6,7,2,5,1,4). The order of the DRS port indices in the second subcarrier where DRS symbols are mapped is (1,4,0,3,6,7,2,5). The order of the DRS port indices in the third subcarrier where DRS symbols are mapped is (2,5,1,4,0,3,6,7).

In the DRS mappings 410-430, the RS symbols for a DRS stream are non-uniformly distributed in a resource block between the two time slots. For example, two RS REs are allocated for DRS port 0 in one time slot, and only one RS RE is allocated for DRS port 0 in another time slot.

Figure 5:
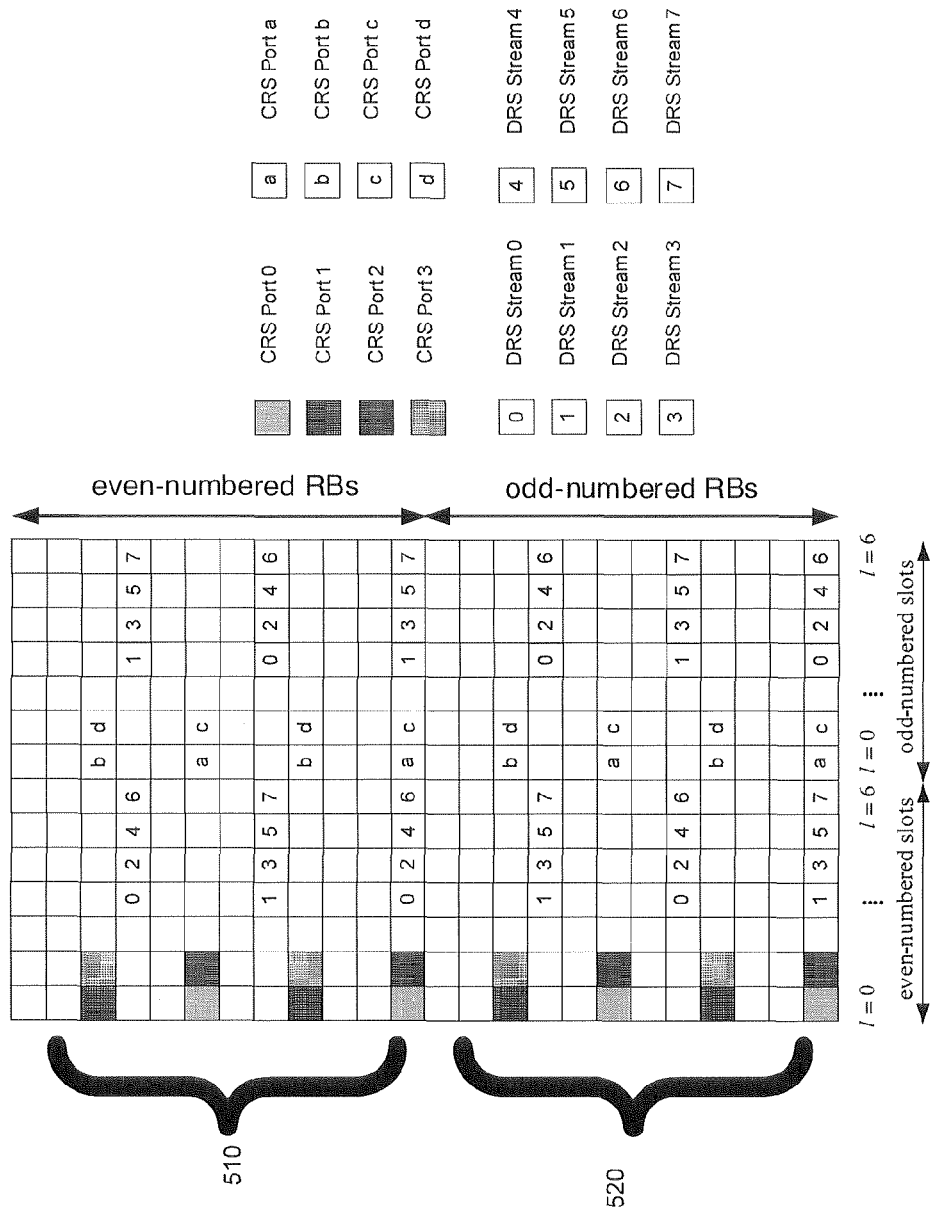
FIG. 5 illustrates consecutive resource blocks assigned to a UE according to an embodiment of the present disclosure.

FIG. 5 illustrates consecutive resource blocks assigned to a UE according to an embodiment of the present disclosure.

Although the DRS mapping 410 shown in FIG. 4 may initially appear to have the DRS streams for a particular port unevenly distributed between two the slots, FIG. 5 shows that when consecutive resource blocks implementing the DRS mapping 410 are transmitted to a UE, an even-odd staggered pattern is created which allows the DRS mapping to be more uniformly distributed between the two time slots. In this example, two adjacent resource blocks 510 and 520 are described. A first resource block 510 whose resource block index is even has the DRS mapping 410 as shown, while a second resource block 520 whose resource block index is odd has the DRS mapping 410 with port indices on the RS REs swapped between 0 and 1, between 2 and 3, and between 6 and 7. As shown in this embodiment, the RS REs for each DRS port are now evenly distributed between the two time slots with three RS REs for each DRS port in each time slot.

Although FIGS. 4 and 5 show the DRS RE locations as being in contiguous OFDM symbols along a subcarrier, one of ordinary skill in the art would recognize that the DRS RE locations could also be located in contiguous subcarriers along an OFDM symbol without departing from the scope or spirit of the present disclosure.

In another embodiment of the present disclosure, four sets of DRS streams are transmitted on the same sets of RS REs, and the DRS streams are separated in terms of different codes, or are code-division-multiplexed (CDM-ed), for example, by multiplexer 290.

Figure 6A:
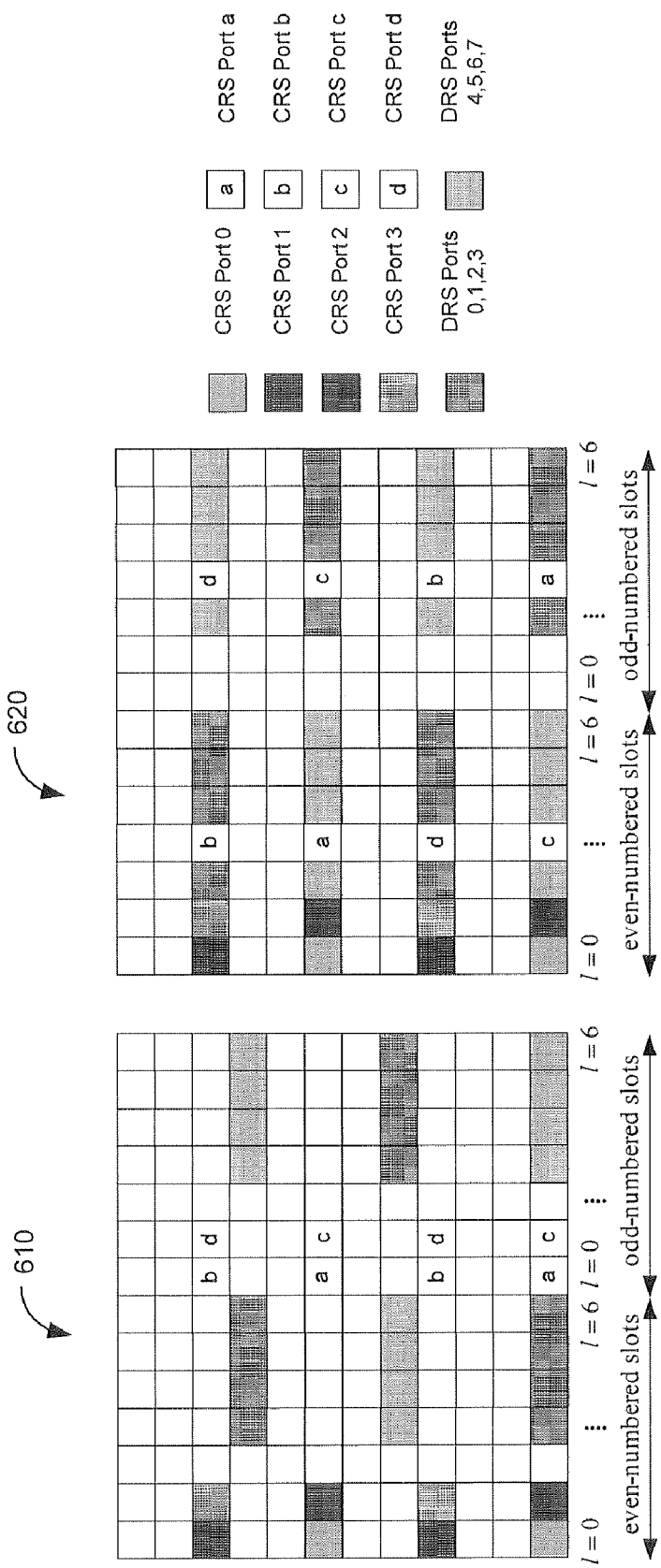
FIG. 6A illustrates DRS mappings according to a further embodiment of the present disclosure.

FIG. 6A illustrates DRS mappings according to a further embodiment of the present disclosure.

The DRS mapping 610 has the same RS RE locations as shown in the DRS mapping 410 of FIG. 4. In this embodiment, four adjacent DRS REs form a group, and as a result, 6 groups are formed. These 6 groups are partitioned into two sets, where each set has 3 groups distributed in a staggered pattern in the time-frequency grid. Each set of groups consists of 4 sets of DRSs, and the 4 sets of DRSs are CDMed using 4 different Walsh codes ($W_0$=[1 1 1 1], $W_1$=[1 1 −1 −1], $W_2$=[1 −1 1 −1] and $W_3$=[1 −1 −1 1]) in 4 REs in each group within the set. Each set of DRS ports is assigned a Walsh code. As shown in FIG. 6A, DRS ports 0,1,2,3 are assigned to one set of groups with Walsh codes $W_0$, $W_1$, $W_2$ and $W_3$, respectively. Similarly, DRS ports 4,5,6,7 are assigned to the other set of groups. Then, when DRS ports 0,1,2,3 are turned on, a DRS symbol, $s_0$, of DRS port 0 is multiplied by $W_0$ and a DRS symbol. Similarly, $s_1$, $s_2$ and $s_3$, of DRS ports 1, 2 and 3, respectively, are multiplied by $W_1$, $W_2$ and $W_3$, respectively. The resultant four symbols from each antenna port are mapped onto a group of four DRS REs. The received signals at a UE on the group of the four DRS REs after this mapping can be described, for example, by Equation 1 below:

$$r=s_0h_0[1\ 1\ 1\ 1]+s_1h_1[1\ 1\ -1\ -1]+s_2h_2[1\ -1\ 1\ -1]+s_3h_3[1\ -1\ -1\ 1],$$ [Eqn. 1]

where $h_0$, $h_1$, $h_2$ and $h_3$ are the channels that are to be measured by the four sets of DRSs. At the UE, to estimate $h_0$, r is multiplied by $W_0$: $r \cdot W_0^t = s_0h_0 \cdot 4 + s_1h_1 \cdot 0 = 4s_0h_0$. With this product, $h_0$ can be estimated without the interference caused from $h_1$. Similarly, $h_1$, $h_2$ and $h_3$ can be estimated from the other products.

The DRS mapping 620 shows another embodiment of a DRS mapping generated in a similar manner to that of the DRS mapping 910.

Figure 6B:
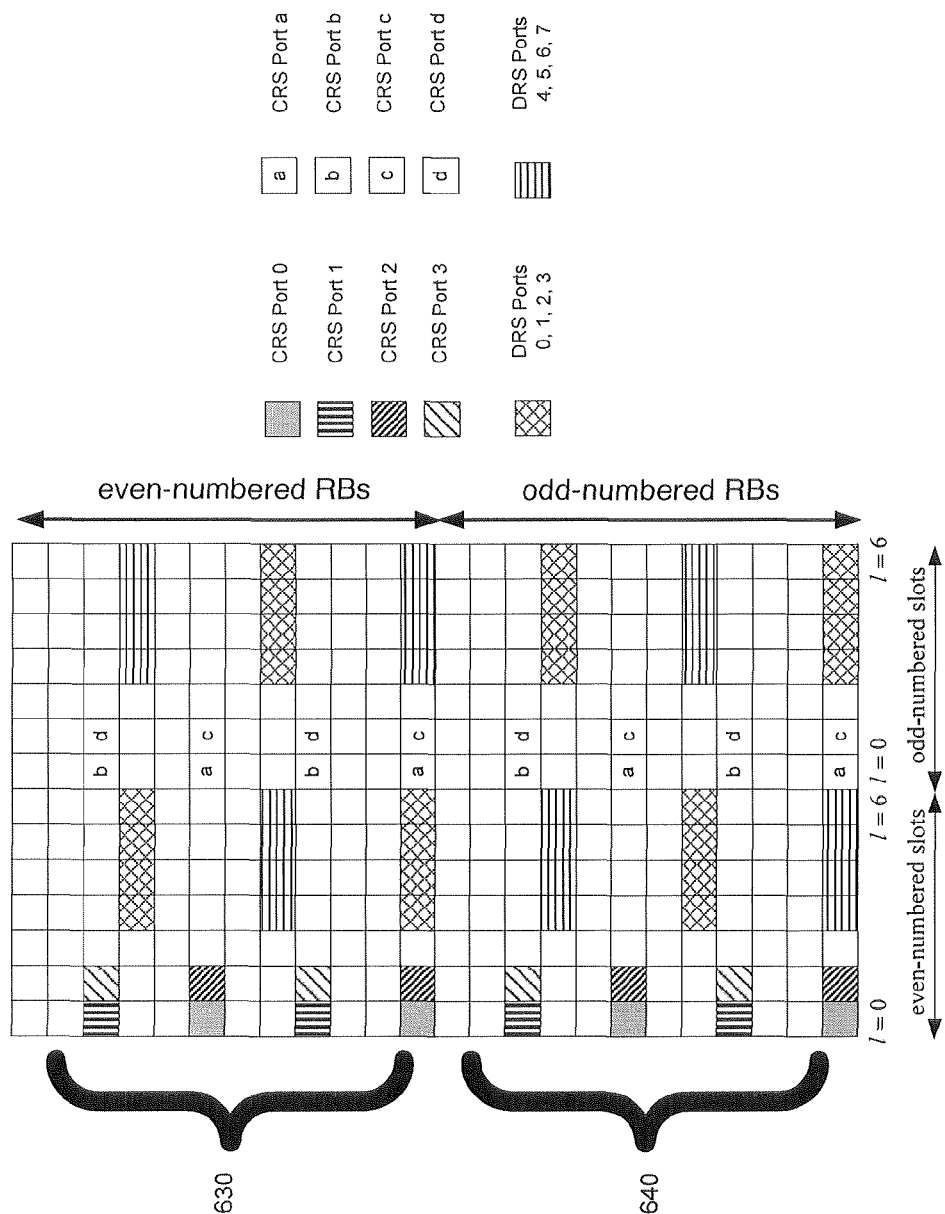
FIG. 6B illustrates consecutive resource blocks assigned to a UE according to an embodiment of the present disclosure.

FIG. 6B illustrates consecutive resource blocks assigned to a UE according to an embodiment of the present disclosure.

Although the DRS mapping 610 shown in FIG. 6A may initially appear to have each set of 3 groups distributed unevenly distributed between two the slots, FIG. 6B shows that when consecutive resource blocks implementing the DRS mapping 610 are transmitted to a UE, an even-odd switching pattern is created which allows the DRS mapping to be more uniformly distributed between the two time slots. In this example, two adjacent resource blocks 630 and 640 are described. A first resource block 630 whose resource block index is even, while a second resource block 930 whose resource block index is odd. As shown in this embodiment, an equal number of groups is distributed between the two time slots with four groups in each time slot.

Although FIGS. 6A and 6B describe the multiplexing of the sets of DRSs in terms of code division multiplexing, one of ordinary skill in the art would recognize that time/frequency division multiplexing could also be implemented without departing from the scope or spirit of the present disclosure. Furthermore, although FIGS. 6A and 6B show the DRS RE locations as being in contiguous OFDM symbols along a subcarrier, one of ordinary skill in the art would recognize that the DRS RE locations could also be located in contiguous subcarriers along an OFDM symbol without departing from the scope or spirit of the present disclosure.

In yet another embodiment of the present disclosure, DRSs can be either precoded or non-precoded.

When non-precoded DRSs are mapped, all 8 sets of DRSs are provided for UE's assigned resource blocks in the associated transmission modes (for example, 8-Tx spatial multiplexing transmissions). The CRSs may or may not be transmitted together with these non-precoded DRSs. In some embodiments, the demodulation in the 8-Tx transmission can be done by utilizing the channel estimates obtained from all 8 sets of DRSs and the precoding vector information available at the UE. In further embodiments, the UE may obtain the precoding vector information via a DL control message sent by an eNodeB with a DL scheduling grant.

When DRSs are precoded, only a rank number of DRSs are provided for UE's assigned resource blocks. In this case, rank indicates the number of transmitted streams, and a stream uses one set of DRSs for demodulation. In one embodiment, the precoding vectors need not be shared between the eNodeB and the UE, while the rank information is shared.

Figure 7:
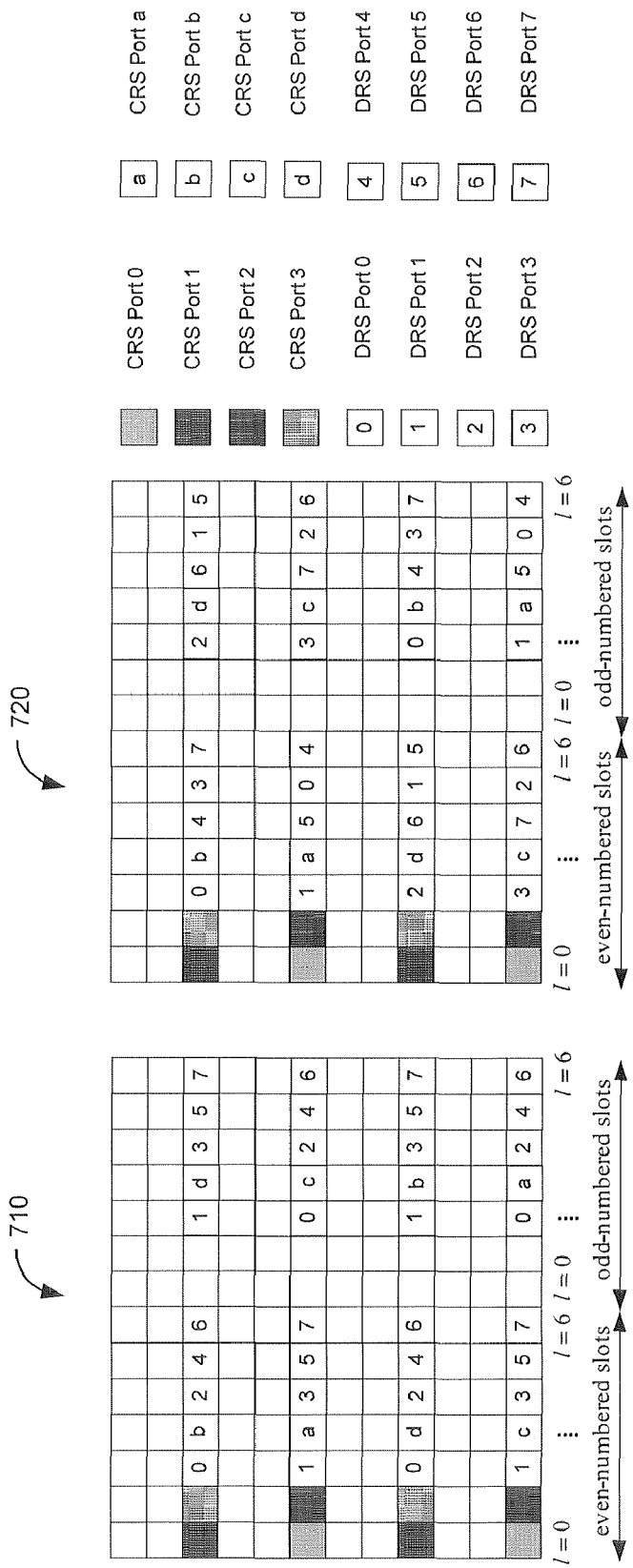
FIG. 7 illustrates DRS mappings according to another embodiment of the present disclosure.

FIG. 7 illustrates DRS mappings according to another embodiment of the present disclosure.

As shown in FIG. 7, each of the eight DRS streams has four RS symbols in a resource block of an LTE-A subframe. Accordingly, a total of 32 REs in the resource block are assigned with RS symbols, and eight OFDM symbols in a subframe are used for RS transmissions. In each of these eight OFDM symbols, four REs are assigned with DRS symbols. These four RS REs in an OFDM symbol are spaced apart in such a way that two data REs are located between any two neighboring DRS REs. The first two OFDM symbols (OFDM symbols 0 and 1) in the first slot have RS REs for antenna ports 0, 1, 2, 3 as in LTE. For the DRSs, eight additional OFDM symbols in a subframe, excluding the OFDM symbols where CRSs are mapped, are chosen. The four RS symbols for each DRS stream are mapped to four different subcarriers in a resource block.

In FIG. 7, OFDM symbols 2, 4, 5, and 6 in both slots are chosen. Of course, one of ordinary skill in the art will recognize that any number of the OFDM symbols 2 to 6 in each slot may be chosen.

In the DRS mapping 710, four RS symbols for each DRS stream are mapped to two OFDM symbols with one OFDM symbol having two RS symbols and the other OFDM symbol also having two RS symbols. The DRS symbols are mapped to four different subcarriers in a resource block. As shown in FIG. 7, in the DRS mapping 710 in the first subcarrier where DRS symbols are mapped, the DRS stream indices are in the order of (0,2,4,6,1,3,5,7); in the second subcarrier, (1,3,5,7, 0,2,4,6); in the third subcarrier, (0,2,4,6,1,3,5,7); in the fourth subcarrier, (1,3,5,7,0,2,4,6).

In the DRS mapping 720, the DRS RE locations are identical to those shown in the DRS mapping 710. The DRS port indices, however, differ. For example, in the DRS mapping 720 in the first subcarrier where DRS symbols are mapped, the DRS port indices are in the order of (0,4,3,7,2,6,1,5). The order of the DRS port indices in the second subcarrier where DRS symbols are mapped is (1,5,0,4,3,7,2,6). The order of the DRS port indices in the third subcarrier where DRS symbols are mapped is (2,6,1,5,0,4,3,7), and order of the DRS port indices in the fourth subcarrier where DRS symbols are mapped is (3,7,2,6,1,5,0,4).

Figure 8:
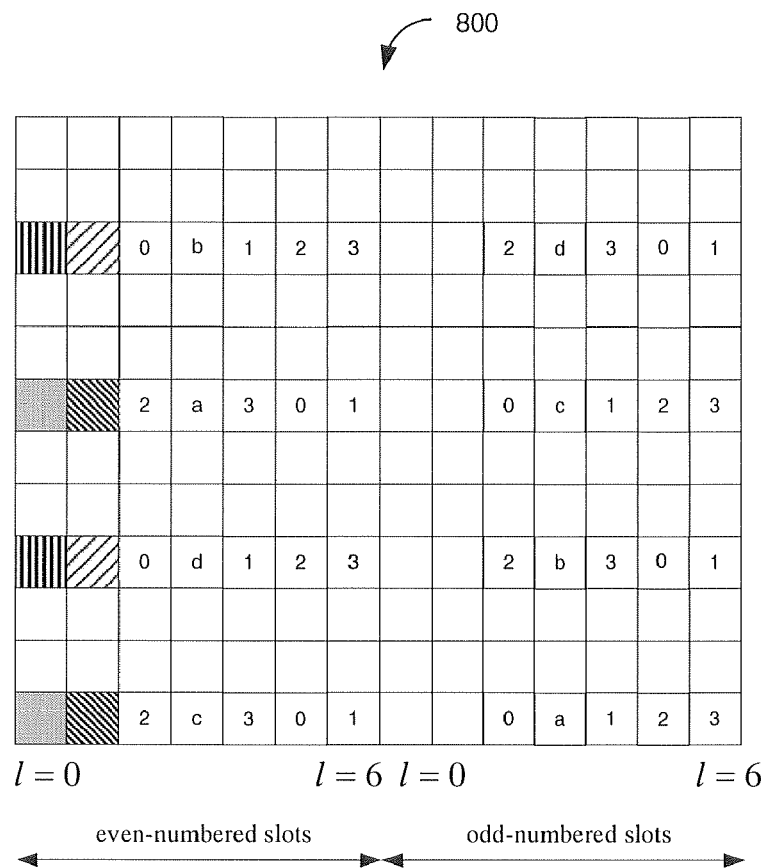
FIG. 8 illustrates a DRS mapping according to yet another embodiment of the present disclosure.
Figure 8:
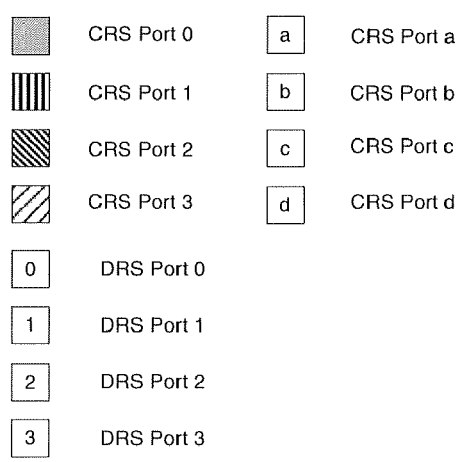

FIG. 8 illustrates a DRS mapping according to yet another embodiment of the present disclosure.

FIG. 8 illustrates a DRS mapping 800 with a rank-4 transmission utilizing 4 antenna ports. In this embodiment, eight RS symbols for each DRS stream are mapped to four OFDM symbols with each OFDM symbol having two RS symbols. The DRS symbols are mapped to four different subcarriers in a resource block. As shown, the density of the DRS mapping 800 is twice the density of the DRS mapping 710, which has a rank-8 utilizing 8 antenna ports.

Accordingly, the concept of RS density dilution with increasing rank is shown. In some embodiments, the density of DRS mappings with a rank at or below a certain threshold rank is twice that of DRS mappings with a rank above the threshold rank.

Figure 9:
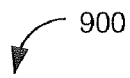
FIG. 9 shows a table illustrating the total number of reference elements (REs) assigned with DRS symbols based on rank according to an embodiment of the present disclosure.

FIG. 9 shows a table 900 illustrating the total number of reference elements (REs) assigned with DRS symbols based on rank according to an embodiment of the present disclosure.

In the embodiment shown in FIG. 9, a threshold rank of 4 is illustrated. However, one of ordinary skill in the art will recognize that any rank can be chosen. As shown in the table 900, when the rank of a DRS mapping is 4 or lower, a density of 8 REs/DRS stream is utilized. When the rank of a DRS mapping is 5 or higher, a density of 4 REs/DRS stream is utilized.

Figure 10:
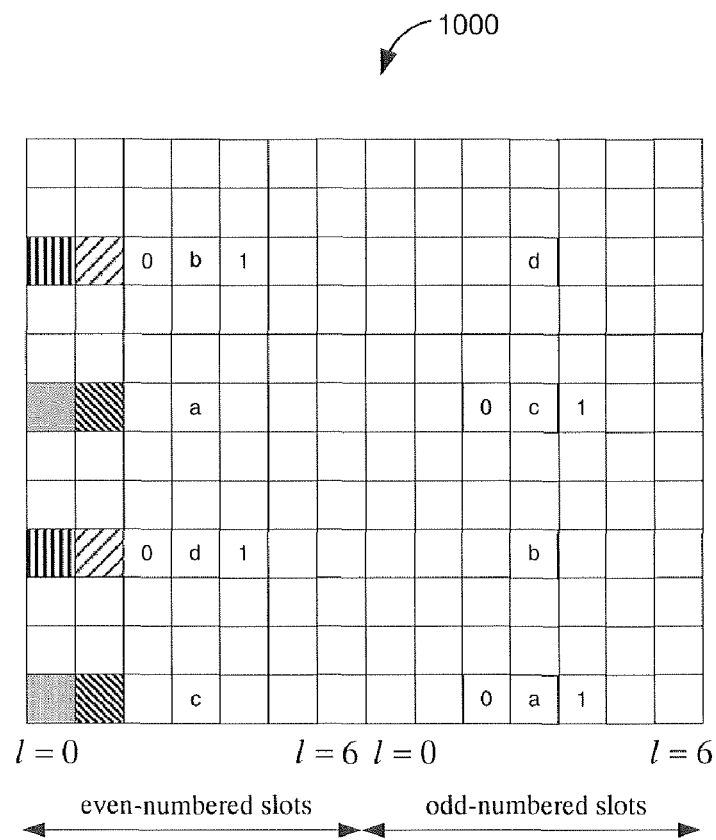
FIG. 10 illustrates a DRS mappings according to yet another embodiment of the present disclosure.

FIG. 10 illustrates a DRS mappings 1000 according to yet another embodiment of the present disclosure.

In one embodiment, a rank number of DRSs is provided by DRSs labeled with indices less than (rank-1). As shown in FIG. 10, if an eNodeB decides to do rank-2 transmission to a UE (i.e., two streams are transmitted), the DRS REs labeled with 0 and 1 are used for DRS transmissions, and all the other DRS REs can be used as data REs.

In another embodiment, when the rank is smaller than 5, an eNodeB may decide to provide a pair of sets of DRSs per stream. For example, as shown in the DRS mapping 700 of FIG. 7, if the eNodeB decides to do rank-4 transmission to a UE, the DRS REs labeled with 0 and 6 are used for DRSs for stream 0, DRS REs with 1 and 7 for stream 1, DRS REs with 2 and 4 for stream 2, and DRS REs with 3 and 5 for stream 3.

To provide strict backward compatibility to LTE UEs, special subframes optimized for LTE-A UEs also are defined by the present disclosure. In these subframes (called LTE-A subframes), LTE UEs can either access only control information transmitted in the control region (the first one or two OFDM symbols in the subframe), or access no OFDM symbols while LTE-A UEs can access information transmitted in all the OFDM symbols in the subframe.

In an embodiment of the present disclosure, the eNodeB informs UEs of the assignment of LTE-A subframes. In one embodiment, the subframe information is sent using signaling in the broadcast control channel (BCCH). For example, binary flags in the BCCH can be used in LTE to designate whether a subframe is a normal (non-MBSFN) subframe or an MBSFN subframe. With this information, LTE UEs can decide whether to read only a few first OFDM symbols, no OFDM symbols, or all the OFDM symbols in a subframe. In addition, additional signaling is performed in the BCCH to indicate to LTE-A UEs whether an MBSFN subframe is used for MBSFN application or for one of the new functions of LTE-A.

In an embodiment of the present disclosure, each of the eight antenna ports has four RS symbols in a resource block of an LTE-A subframe, and thus these RS symbols are mapped onto 32 REs in the resource block. Eight OFDM symbols in a subframe are used for RS transmissions. In each of these eight OFDM symbols, four REs are assigned with RS symbols. These four RS REs in an OFDM symbol are spaced apart in such a way that two data REs are located between any two neighboring RS REs. The first two OFDM symbols (OFDM symbols 0 and 1) in the first slot have RS REs for antenna ports 0,1,2,3 as in LTE. For the remaining RS symbols, six additional OFDM symbols in a subframe are chosen. The subcarrier indices on which the RS REs are located in the six OFDM symbols can be either the same as or different from those in the first two OFDM symbols.

In one embodiment of the present disclosure, the new sets of CRSs for the additional antenna ports available in LTE-A are used for CQI/PMI/RI measurement and multiple (up to eight) sets of DRSs are separately provided for demodulation. Onto a resource block assigned to an LTE-A UE in an LTE-A subframe, either sets of DRSs or sets of new CRSs or both types of RSs can be mapped.

Figure 11:
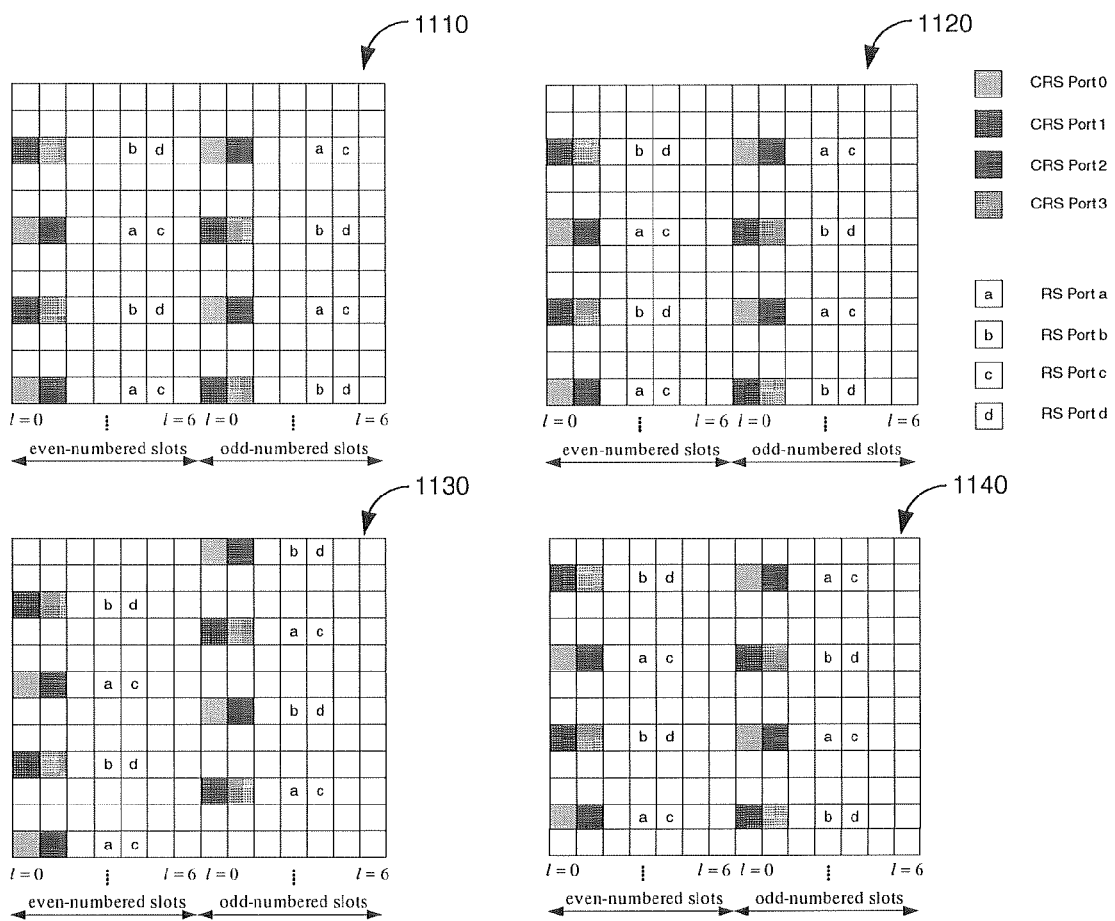
FIG. 11 illustrates normal cyclic-prefix, RS mappings according to an embodiment of the present disclosure.

FIG. 11 illustrates normal cyclic-prefix, RS mappings according to an embodiment of the present disclosure.

Figure 12:
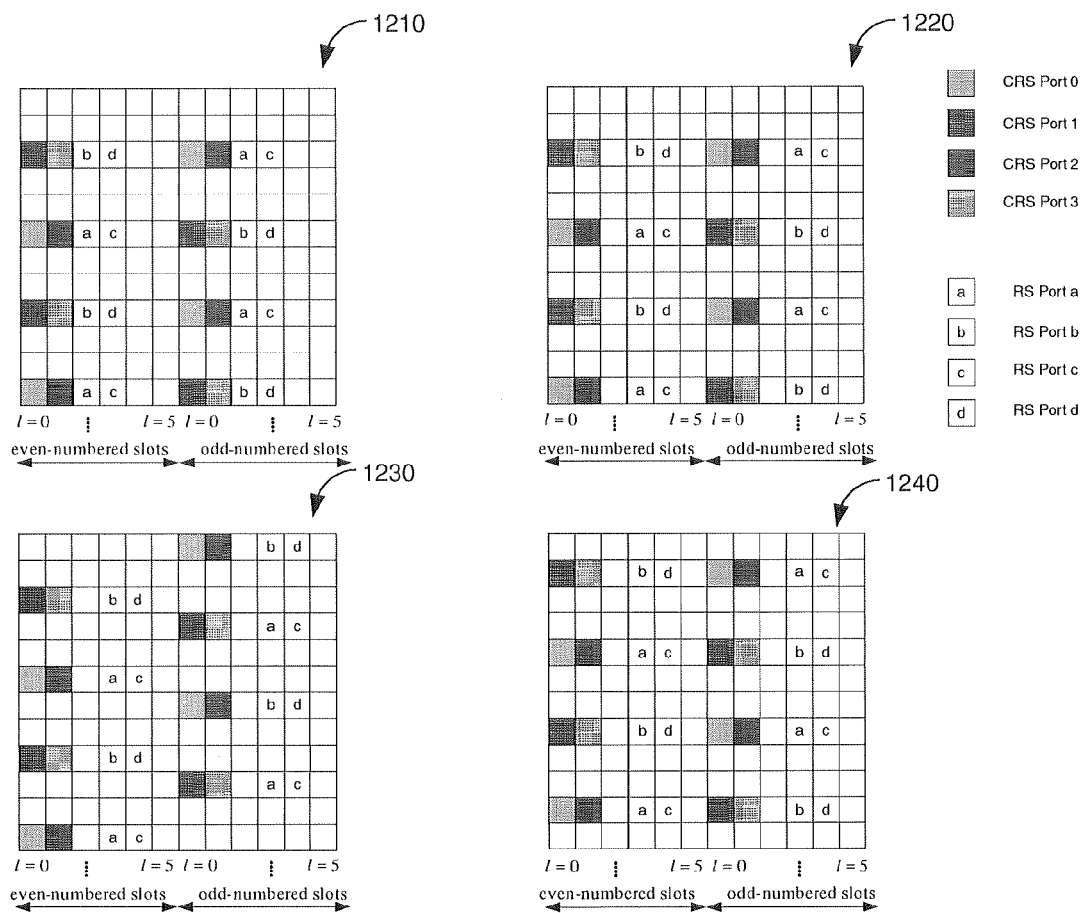
FIG. 12 illustrates extended cyclic-prefix, RS mappings according to an embodiment of the present disclosure.

FIG. 12 illustrates extended cyclic-prefix, RS mappings according to an embodiment of the present disclosure.

FIG. 11 illustrates an RS mapping 1110. As shown in this embodiment, the RSs for antenna ports a, b, c and d are mapped onto REs in OFDM symbols 4 and 5 in both slots, while the RSs for antenna ports 1,2,3,4 are mapped onto REs in OFDM symbols 0 and 1 in both slots. The RS REs for an antenna port are mapped in a staggered pattern in the time-frequency grid. For example, the RSs are mapped in the order of (b, a, b, a) from the top to the bottom in OFDM symbol 4 in subframe 1, and the RSs are mapped in the order of (a, b, a, b) in OFDM symbol 4 in subframe 2.

FIG. 12 illustrates an RS mapping 1210. As shown in this embodiment, OFDM symbols 2 and 3 in both slots are used for the RS mapping. Although different OFDM symbols are used for the RSs for antenna ports a, b, c and d as compared to the RS mapping 1110 of FIG. 11, the staggered pattern in the time-frequency grid is still maintained for the RS RE of those antenna ports.

Similarly, the RS mapping 1220 uses different OFDM symbols for the RSs for antenna ports a, b, c and d from the RS mapping 1210.

The RS mapping 1130 uses the same OFDM symbols as the mapping 1120 for the RS mapping, while the RSs in the OFDM symbols 4 and 5 in slot 2 are mapped onto different REs from the RSs in the OFDM symbols 4 and 5 in slot 1. Likewise, the RS mapping 1230 uses the same OFDM symbols as the RS mapping 1220, while the RSs in the OFDM symbols 3 and 4 in slot 2 are mapped onto different REs from the RSs in the OFDM symbols 3 and 4 in slot 1.

In the RS mapping 1140 and the RS mapping 1240, cell-specific frequency shifting is applied on the RS mapping 1120 and the RS mapping 1220, respectively. The subcarrier indices for the RS REs are circularly shifted by 1 from the RS mapping 1120 and the RS mapping 1220.

For the estimation of the channels for antenna ports 0, 1, 2, and 3 in a subframe, a UE may utilize RSs in the first two OFDM symbols in the next subframe in which additional RS REs are mapped for antenna ports 0, 1, 2 and 3, as well as the RSs mapped in the current subframe.

In another embodiment of the present disclosure, each of the eight antenna ports has two RS symbols in a resource block of an LTE-A subframe, and thus these RS symbols are mapped onto 16 REs in the resource block. Four OFDM symbols in a subframe are used for RS transmissions. These four RS REs in an OFDM symbol are spaced apart in such a way that two data REs are located between any two neighboring RS REs. The first two OFDM symbols (OFDM symbols 0 and 1) in the first slot may or may not have RS REs for antenna ports 0, 1, 2, 3 as in LTE. When the first two OFDM symbols in the first slot have LTE RSs, two additional OFDM symbols from the remaining OFDM symbols in a subframe are chosen for the remaining sets of the RSs. The subcarrier indices on which the RS REs are located in the two OFDM symbols can be either the same as or different from those in the first two OFDM symbols. On the other hand, when all the OFDM symbols are not accessible by LTE UEs, four OFDM symbols are chosen out of the 14 OFDM symbols in a subframe.

Figure 13:
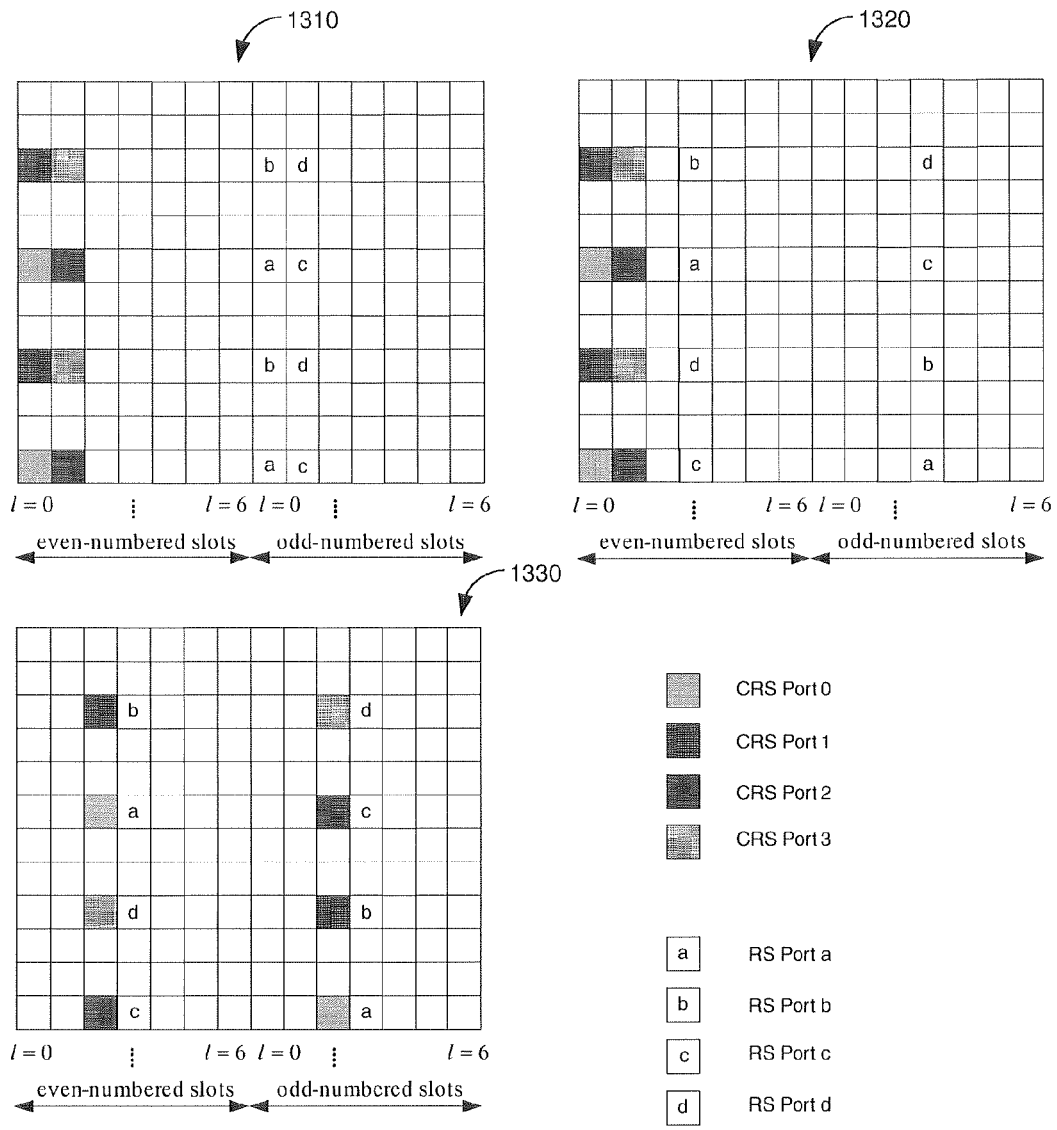
FIG. 13 illustrates RS mappings according to an embodiment of the present disclosure.

FIG. 13 illustrates RS mappings according to an embodiment of the present disclosure.

In the RS mapping 1310, OFDM symbols 0 and 1 in the second slot are chosen for two additional OFDM symbols having RS REs. In OFDM symbol 0, RSs for antenna ports a and b are mapped from top to bottom in the order of (b,a,b,a). In OFDM symbol 1, RSs for antenna ports c and d are mapped from top to bottom in the order of (d,c,d,c).

In the RS mapping 1320, OFDM symbols 3 in both slots are chosen for two additional OFDM symbols having RS REs. In OFDM symbol 3 in the first slot, RSs for antenna ports a, b, c, and d are mapped from top to bottom in the order of (b,a,d,c). In OFDM symbol 3 in the second slot, RSs are mapped from top to bottom in the order of (d,c,b,a). In this embodiment, if antenna ports 0, 1, 2, 3, a, b, c and d are associated with physical antennas 0, 1, 2, 3, 4, 5, 6, and 7, the power of an RS symbol is boosted by four times to the power of a data symbol by pulling the unused power from the other three REs mapped for the other antennas' RS signals.

In the RS mapping 1330, none of the OFDM symbols in an LTE-A subframe are accessible by LTE UEs. The CRSs for antenna ports 0, 1, 2 and 3 are mapped to REs different from the corresponding CRS REs in LTE. CRS ports 0, 1, 2 and 3 are mapped in OFDM symbol 2 in both slots, while CRS ports a, b, c and d are mapped in OFDM symbol 3 in both slots. In OFDM symbol 2 in the first slot, RSs for antenna ports 0, 1, 2, and 3 are mapped from top to bottom in the order of (1,0,3,2). In OFDM symbol 2 in the second slot, RSs are mapped from top to bottom in the order of (3,2,1,0).

For the estimation of the channels for antenna ports 0, 1, 2, and 3 in a subframe, a UE may utilize RSs in the first two OFDM symbols in the next subframe in which additional RS REs are mapped for antenna ports 0, 1, 2 and 3, as well as the RSs mapped in the current subframe.

In an embodiment of the present disclosure, the sets of RSs for a, b, c and d mapped to the time-frequency grid according to the mapping methods depicted in FIGS. 11, 12 and 13 above are utilized as the four new sets of CRSs for four additional antenna ports available in LTE-A.

The new sets of CRSs can be used either for CQI/PMI/RI measurement and/or demodulation at a UE.

The new sets of CRSs are transmitted by an eNodeB in LTE-A subframes. Within these subframes, the new sets of CRSs are transmitted by the eNodeB either in all the resource blocks (RBs) over the entire bandwidth, or only in a subset of the RBs.

The new sets of CRSs are transmitted by the eNodeB in such a way that the CRSs do not collide the primary synchronization signal (PSS) and the secondary synchronization signal (SSS) defined in LTE. In one embodiment, the eNodeB configures the transmission in such a way that LTE-A subframes do not coincide with subframes where PSS and SSS are transmitted.

Figure 14:
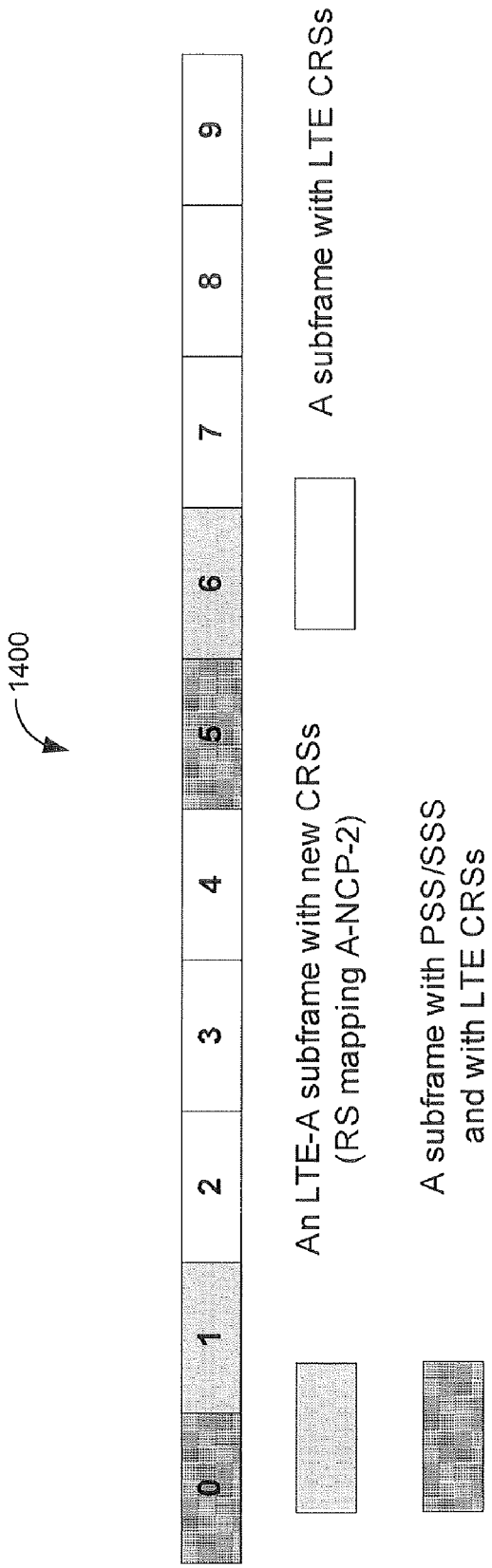
FIG. 14 illustrates a subframe classification according to an embodiment of the present disclosure.

FIG. 14 illustrates a subframe classification 1400 according to an embodiment of the present disclosure.

In this embodiment, an LTE-A eNodeB performs signaling in the BCCH to inform LTE and LTE-A UEs which subframes are LTE-A subframes. As shown in FIG. 14, in subframes 1 and 6, which are LTE-A subframes, the CRSs mapped by the RS mapping 1120, for example, are transmitted. In the other subframes, the CRSs mapped according to the LTE specification are transmitted. In some embodiments, the scheduler avoids using subframes 0 and 5 for LTE-A subframes to ensure that PSS and SSS are intact.

The new sets of CRSs can be transmitted in LTE subframes and/or LTE-A subframes. For example, the RS mapping 1310 can only be transmitted in LTE-A subframes since the new CRS REs collide with the LTE CRS REs. Conversely, the RS mapping 1320 can be transmitted both in LTE subframes and LTE-A subframes since the new CRS REs do not collide with the LTE CRS REs. Accordingly, the new sets of CRSs can be transmitted by eNodeBs in all subframes including subframes in which PSS/SSS are transmitted, or just in certain subframes, either periodically or non-periodically. Within these subframes, the new sets of CRSs are transmitted either in all the resource blocks (RBs) over the entire bandwidth, or only in a subset of the RBs.

Figure 15:
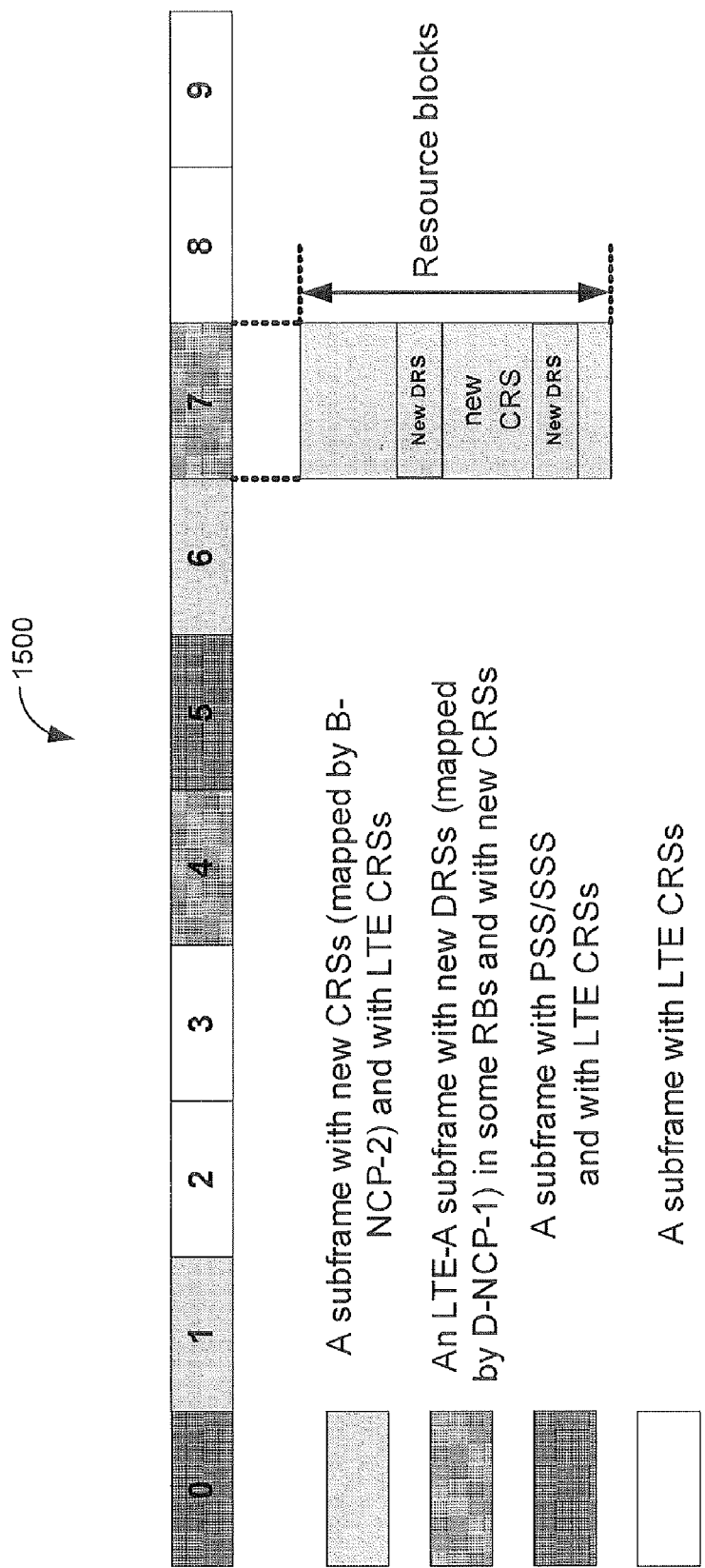
FIG. 15 illustrates a subframe classification according to a further embodiment of the present disclosure.

FIG. 15 illustrates a subframe classification 1500 according to a further embodiment of the present disclosure.

As shown in FIG. 15, both LTE CRSs and LTE-A CRSs mapped, for example, by the RS mapping 1320 are transmitted in subframes 1 and 6. The eNodeB performs signaling in the BCCH to inform LTE and LTE-A UEs which subframes are LTE-A subframes. In this embodiment, sets of DRSs mapped, for example, by the DRS mapping 700 are transmitted to resource blocks assigned to LTE-A UEs along with the CRSs mapped by the RS mapping 1320 in subframes 4 and 7, which are LTE-A subframes. In the other subframes, the LTE CRSs are transmitted. In some embodiments, the scheduler avoids using subframes 0 and 5 for LTE-A subframes to ensure that PSS and SSS remain intact.

Figure 16:
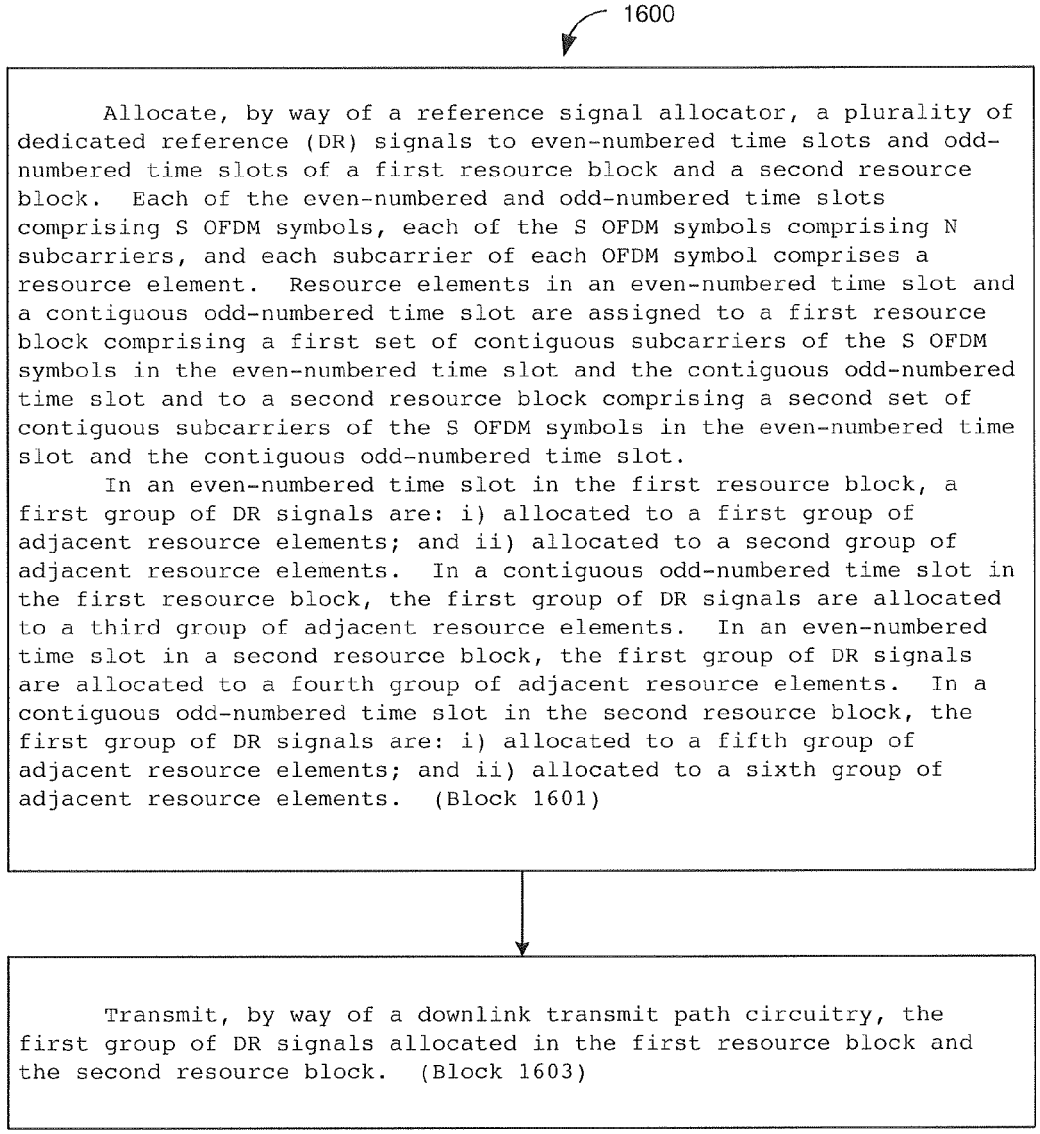
FIG. 16 illustrates a method of operating a base station according to an embodiment of the present disclosure.

FIG. 16 illustrates a method 1600 of operating a base station according to an embodiment of the present disclosure.

As shown in FIG. 16, method 1600 further comprises allocating, by way of a reference signal allocator, a plurality of dedicated reference (DR) signals to even-numbered time slots and odd-numbered time slots of a first resource block and a second resource block. Each of the even-numbered and odd-numbered time slots comprising S OFDM symbols. Each of the S OFDM symbols comprising N subcarriers, and each subcarrier of each OFDM symbol comprises a resource element. Resource elements in an even-numbered time slot and a contiguous odd-numbered time slot are assigned to the first resource block comprising a first set of contiguous subcarriers of the S OFDM symbols in the even-numbered time slot and the contiguous odd-numbered time slot and to the second resource block comprising a second set of contiguous subcarriers of the S OFDM symbols in the even-numbered time slot and the contiguous odd-numbered time slot.

In an even-numbered time slot in the first resource block, a first group of DR signals are: i) allocated to a first group of adjacent resource elements; and ii) allocated to a second group of adjacent resource elements. In a contiguous odd-numbered time slot in the first resource block, the first group of DR signals are allocated to a third group of adjacent resource elements. In an even-numbered time slot in a second resource block, the first group of DR signals are allocated to a fourth group of adjacent resource elements. In a contiguous odd-numbered time slot in the second resource block, the first group of DR signals area i) allocated to a fifth group of adjacent resource elements; and ii) allocated to a sixth group of adjacent resource elements. (Block 1601)

Method 1600 further comprises transmitting, by way of a downlink transmit path circuitry, the first group of DR signals allocated in the first resource block and the second resource block. (Block 1603)

Figure 17:
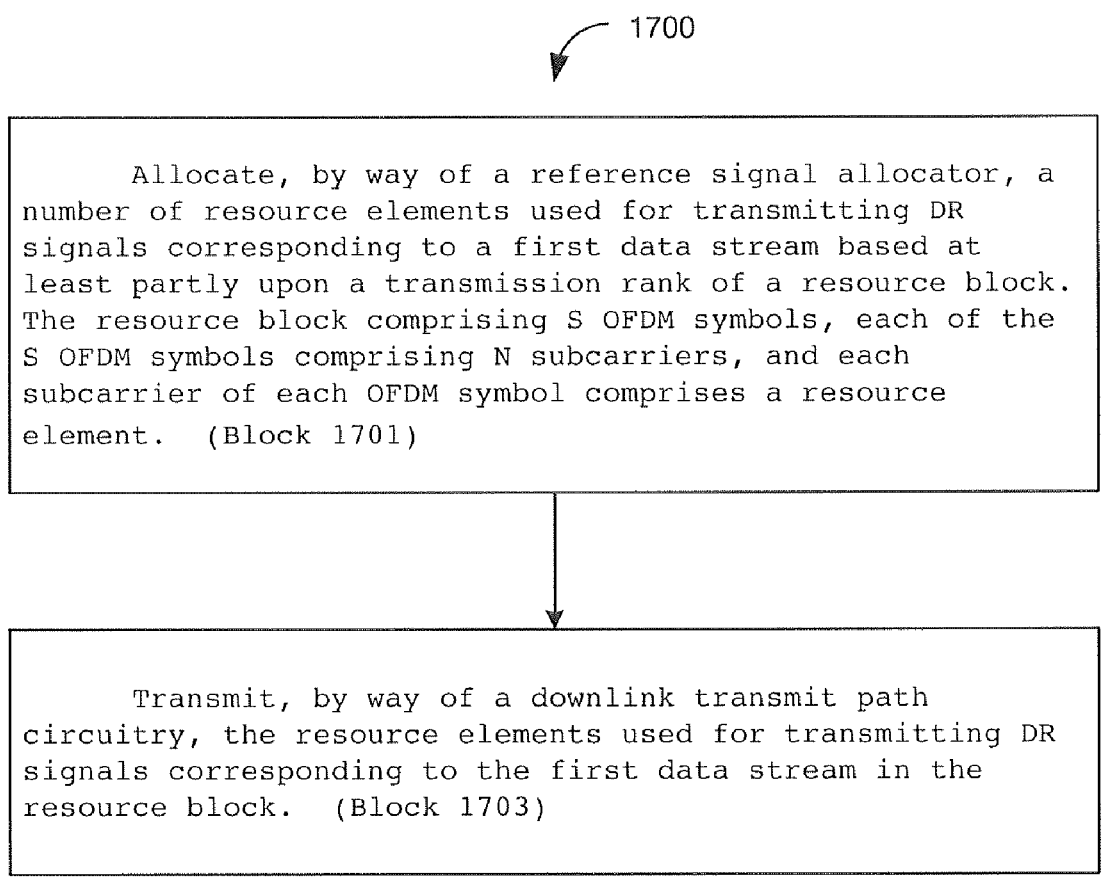
FIG. 17 illustrates a method of operating a base station according to a further embodiment of the present disclosure.

FIG. 17 illustrates a method 1700 of operating a base station according to a further embodiment of the present disclosure.

As shown in FIG. 17, method 1700 allocating, by way of a reference signal allocator, a number of resource elements used for transmitting DR signals corresponding to a first data stream based at least partly upon a transmission rank of a resource block. The resource block comprising S OFDM symbols, each of the S OFDM symbols comprising N subcarriers, and each subcarrier of each OFDM symbol comprises a resource element. (Block 1701)

Method 1700 further comprises transmitting, by way of a downlink transmit path circuitry, the resource elements used for transmitting DR signals corresponding to the first data stream in the resource block. (Block 1703)

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network comprising a plurality of base stations for communicating with subscriber stations using orthogonal frequency division multiplexing (OFDM), wherein a first base station comprises:
a downlink transmit path comprising circuitry configured to transmit a plurality of dedicated reference (DR) signals in even-numbered time slots and odd-numbered time slots, each of the even-numbered and odd-numbered time slots comprising S OFDM symbols, each of the S OFDM symbols comprising N subcarriers, and each subcarrier of each OFDM symbol comprises a resource element, and wherein resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot; and
a reference signal allocator configured to allocate the plurality of DR signals to selected resource elements, wherein:
in the even-numbered time slot in the first resource block, a first group of DR signals are: i) allocated to a first group of adjacent resource elements; and ii) allocated to a second group of adjacent resource elements;
in the contiguous odd-numbered time slot in the first resource block, the first group of DR signals are allocated to a third group of adjacent resource elements;
in the even-numbered time slot in the second resource block, the first group of adjacent DR signals are allocated to a fourth group of resource elements; and
in the contiguous odd-numbered time slot in the second resource block, the first group of DR signals are: i) allocated to a fifth group of adjacent resource elements; and ii) allocated to a sixth group of adjacent resource elements.

2. The first base station as set forth in claim 1 wherein the downlink transmit path further comprising a multiplexer configured to code division multiplex the first group of DR signals using a plurality of orthogonal codes.

3. The first base station as set forth in claim 2 wherein the plurality of orthogonal codes comprises Walsh codes.

4. The first base station as set forth in claim 1 wherein the downlink transmit path further comprises a multiplexer configured to time/frequency division multiplex the first group of DR signals.

5. The first base station as set forth in claim 1 wherein the groups of adjacent resource elements are in contiguous OFDM symbols.

6. The first base station as set forth in claim 1 wherein the groups of adjacent resource elements are in contiguous subcarriers.

7. The first base station as set forth in claim 1 wherein the first group of DR signals are allocated in a staggered pattern in the first and second resource blocks.

8. A wireless network comprising a plurality of base stations capable of wireless communication with a plurality of subscriber stations within a coverage area of the network using orthogonal frequency division multiplexing (OFDM), wherein each of the plurality of base stations comprises:
   a downlink transmit path comprising circuitry configured to transmit a plurality of dedicated reference (DR) signals in even-numbered time slots and odd-numbered time slots, each of the even-numbered and odd-numbered time slots comprising S OFDM symbols, each of the S OFDM symbols comprising N subcarriers, and each subcarrier of each OFDM symbol comprises a resource element, and wherein resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot; and
   a reference signal allocator configured to allocate the plurality of DR signals to selected resource elements, wherein:
      in the even-numbered time slot in the first resource block, a first group of DR signals are: allocated to a first group of adjacent resource elements; and ii) allocated to a second group of adjacent resource elements;
      in the contiguous odd-numbered time slot in the first resource block, the first group of DR signals are allocated to a third group of adjacent resource elements;
      in the even-numbered time slot in the second resource block, the first group of adjacent DR signals are allocated to a fourth group of resource elements; and
      in the contiguous odd-numbered time slot in the second resource block, the first group of DR signals are: i) allocated to a fifth group of adjacent resource elements; and ii) allocated to a sixth group of adjacent resource elements.

9. A method of operating a base station for communicating with subscriber stations using orthogonal frequency division multiplexing (OFDM), the method comprising:
   transmitting, by way of a downlink transmit path circuitry, a plurality of dedicated reference (DR) signals in even-numbered time slots and odd-numbered time slots, each of the even-numbered and odd-numbered time slots comprising S OFDM symbols, each of the S OFDM symbols comprising N subcarriers, and each subcarrier of each OFDM symbol comprises a resource element, and wherein resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot; and
   allocating, by way of a reference signal allocator, the plurality of DR signals to selected resource elements, wherein:
      in the even-numbered time slot in the first resource block, a first group of DR signals are: i) allocated to a first group of adjacent resource elements; and ii) allocated to a second group of adjacent resource elements;
      in the contiguous odd-numbered time slot in the first resource block, the first group of DR signals are allocated to a third group of adjacent resource elements;
      in the even-numbered time slot in the second resource block, the first group of adjacent DR signals are allocated to a fourth group of resource elements; and
      in the contiguous odd-numbered time slot in the second resource block, the first group of DR signals are: i) allocated to a fifth group of adjacent resource elements; and ii) allocated to a sixth group of adjacent resource elements.

10. The method as set forth in claim 9 further comprising:
   multiplexing, by way of the downlink transmit path circuitry, the first group of DR signals using a plurality of orthogonal codes.

11. For use in a wireless network comprising a subscriber station communicating with a base station using orthogonal frequency division multiplexing (OFDM), wherein the subscriber station comprises:
   a downlink reception path comprising circuitry configured to receive a plurality of dedicated reference (DR) signals in even-numbered time slots and odd-numbered time slots, each of the even-numbered and odd-numbered time slots comprising S OFDM symbols, each of the S OFDM symbols comprising N subcarriers, and each subcarrier of each OFDM symbol comprises a resource element, and wherein resource elements in an even-numbered time slot and a contiguous odd-numbered time slot are assigned to a first resource block comprising a first set of contiguous subcarriers of the S OFDM symbols in the even-numbered time slot and the contiguous odd-numbered time slot and to a second resource block comprising a second set of contiguous subcarriers of the S OFDM symbols in the even-numbered time slot and the contiguous odd-numbered time slot;
   wherein:
      in the even-numbered time slot in the first resource block, a first group of DR signals are: i) allocated to a first group of adjacent resource elements; and ii) allocated to a second group of adjacent resource elements;
      in the contiguous odd-numbered time slot in the first resource block, the first group of DR signals are allocated to a third group of adjacent resource elements;
      in the even-numbered time slot in the second resource block, the first group of adjacent DR signals are allocated to a fourth group of resource elements; and
      in the contiguous odd-numbered time slot in the second resource block, the first group of DR signals area i) allocated to a fifth group of adjacent resource elements; and ii) allocated to a sixth group of adjacent resource elements.

12. The subscriber station as set forth in claim 11 wherein the downlink reception path further comprises circuitry configured to de-multiplex the first group of DR signals.

13. The subscriber station as set forth in claim 11 wherein the downlink reception path further comprises circuitry configured to estimate channels across the first and second resource blocks.

14. For use in a wireless network comprising a plurality of base stations for communicating with subscriber stations using orthogonal frequency division multiplexing (OFDM), wherein a first base station comprises:
- a downlink transmit path comprising circuitry configured to transmit a plurality of dedicated reference (DR) signals in a resource block, the resource block comprising S OFDM symbols, each of the S OFDM symbols comprising N subcarriers, and each subcarrier of each OFDM symbol comprises a resource element; and
- a reference signal allocator configured to allocate a number of resource elements of the resource block for transmitting DR signals corresponding to a first data stream, and to adjust the number of resource elements used for transmitting DR signals corresponding to the first data stream based at least partly upon a transmission rank of the resource block,
- wherein the transmission rank is based at least partly upon a number of different data streams transmitted in the resource block.

15. The base station as set forth in claim 14 wherein the reference signal allocator is configured to re-allocate, to the first data stream, resource elements used for transmitting DR signals corresponding to a second data stream if the transmission rank of the resource block is below a threshold rank.

16. The base station as set forth in claim 14 wherein the reference signal allocator is configured to re-allocate, to a second data stream, a portion of the resource elements used for transmitting DR signals corresponding to the first data stream if the transmission rank of the resource block is above a threshold rank.

17. A wireless network comprising a plurality of base stations capable of wireless communication with a plurality of subscriber stations within a coverage area of the network using orthogonal frequency division multiplexing (OFDM), wherein each of the plurality of base stations comprises:
- a downlink transmit path comprising circuitry configured to transmit a plurality of dedicated reference (DR) signals in a resource block, the resource block comprising S OFDM symbols, each of the S OFDM symbols comprising N subcarriers, and each subcarrier of each OFDM symbol comprises a resource element; and
- a reference signal allocator configured to allocate a number of resource elements of the resource block for transmitting DR signals corresponding to a first data stream, and to adjust the number of resource elements used for transmitting DR signals corresponding to the first data stream based at least partly upon a transmission rank of the resource block,
- wherein the transmission rank is based at least partly upon a number of different data streams transmitted in the resource block.

18. A method of operating a base station for communicating with subscriber stations using orthogonal frequency division multiplexing (OFDM), the method comprising:
- transmitting, by way of a downlink transmit path circuitry, a plurality of dedicated reference (DR) signals in a resource block, the resource block comprising S OFDM symbols, each of the S OFDM symbols comprising N subcarriers, and each subcarrier of each OFDM symbol comprises a resource element; and
- allocating, by way of a reference signal allocator, a number of resource elements of the resource block for transmitting DR signals corresponding to a first data stream,
- wherein the number of resource elements used for transmitting DR signals corresponding to the first data stream is based at least partly upon a transmission rank of the resource block, and
- wherein the transmission rank is based at least partly upon a number of different data streams transmitted in the resource block.

19. The method as set forth in claim 18 wherein allocating the number of resource elements used for transmitting DR signals corresponding to the first data stream comprises:
- re-allocating, to the first data stream, resource elements used for transmitting DR signals corresponding to a second data stream if the transmission rank of the resource block is below a threshold rank.

20. The method as set forth in claim 18 wherein allocating the number of resource elements used for transmitting DR signals corresponding to the first data stream comprises:
- re-allocating, to a second data stream, a portion of the resource elements used for transmitting DR signals corresponding to the first data stream if the transmission rank of the resource block is above a threshold rank.

* * * * *